United States Patent [19]
Kim et al.

[11] Patent Number: 5,708,746
[45] Date of Patent: Jan. 13, 1998

[54] RAIL-TYPE DEVICE FOR MECHANICALLY SPLICING OPTICAL FIBERS

[75] Inventors: Han Ha Kim; Young Tak Lee, both of Seoul; Jae Kuk Nam, Sungnam; Byung Chul Lee, Seoul; Jong Young Ha, Seoul; Young Bok Choi, Seoul; Mee Kyung Kim, Seoul; Jong Sup Kim, Anyang; Oh Duck Kwon, Inchon-jikhal; Kun Ik Jun, Seoul; Young Kyu Lee, Kumi, all of Rep. of Korea

[73] Assignee: Korea Telecommunication Authority, Rep. of Korea

[21] Appl. No.: 571,075

[22] Filed: Dec. 12, 1995

[30] Foreign Application Priority Data

Dec. 12, 1994 [KR] Rep. of Korea ............... 94-33688

[51] Int. Cl.⁶ ................................................ G02B 6/36
[52] U.S. Cl. ......................... 385/95; 385/96; 385/97
[58] Field of Search ......................... 385/95–99, 147

[56] References Cited

U.S. PATENT DOCUMENTS 5,042,902 8/1991 Huebscher et al. ............... 385/95 X
5,189,717 2/1993 Larson et al. ..................... 385/95

Primary Examiner—Phan T. H. Palmer
Attorney, Agent, or Firm—Merchant, Gould Smith, Edell Welter & Schmidt P.A.

[57] ABSTRACT

A structurally improved rail-type device for mechanically splicing optical fibers while reducing the splicing loss is disclosed. The above splicing device not only has a cladding clamp with a seesaw structure thereby easily splicing the optical fibers, it also separately moves the covers relative to the body to easily perform the tuning operation. Due to coating clamp's protrusions and body's slots engaging with each other, the coating clamp exclusively vertically move relative to the body and prevent the optical fibers from being axially thrust. The splicing device further seperately clamps the coating and cladding parts of the optical fibers, thereby preventing the spliced fibers from breaking due to tensile or torsional force. The sliding motion of the covers relative to the body is achieved by the rails of the covers and rail grooves of the body.

19 Claims, 6 Drawing Sheets

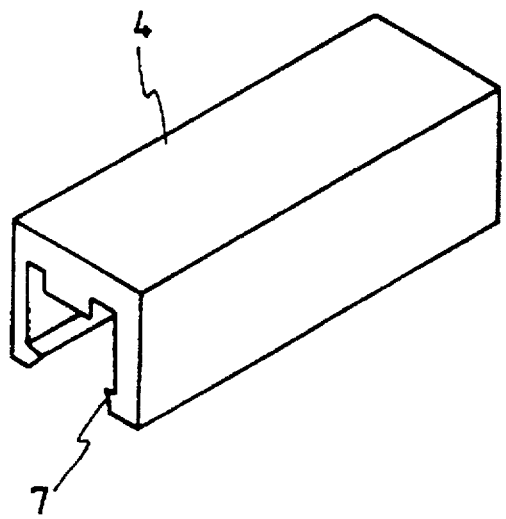
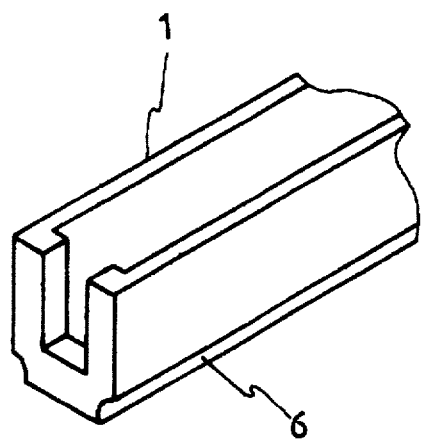
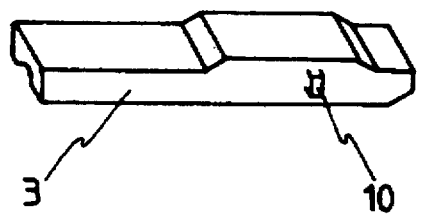
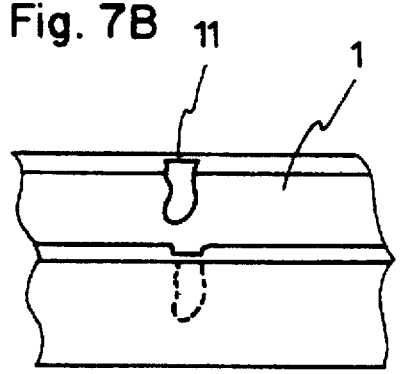

RAIL-TYPE DEVICE FOR MECHANICALLY SPLICING OPTICAL FIBERS

BACKGROUND OF THE INVENTION

1. Field of the Invention

The present invention relates in general to an optical fiber splicing device for mechanically splicing optical fibers having a single or multi-core structure. More particularly, the present invention relates to an optical fiber splicing device of the rail type having a seesaw-type cladding clamp suitable for not only tightly clamping the optical fibers by a size interference between covers and the clamp of the device but also allowing the optical fibers to be easily inserted into the device, thereby separately clamping the coating and cladding parts of the optical fibers during the optical fiber splicing operation.

2. Description of the Prior Art

As well known to those skilled in the art, optical fibers have been spliced together through several methods. Representative typical methods for splicing optical fibers are fusion splicing and mechanical splicing. In the typical fusion splicing method, the optical fibers are melted to be spliced. The above fusion splicing method has been generally used for permanently splicing the optical fibers. This fusion splicing method has a good operational reliability as it results in high optical characteristics. However, as the above fusion splicing method has to be performed with an expensive precise fusion splicing system while applying electric power to the system, the fusion splicing method has a problem in that it is scarcely used in a place where it is difficult to obtain electric power.

Meanwhile, the mechanical splicing method has several advantages in that the method can be easily performed and doesn't need any additional devices. The mechanical splicing method can be thus easily used in any place. In addition, the optical characteristics expected by the mechanical splicing method is almost equal to those expected by the above fusion splicing method.

However, as the known mechanical splicing method is performed with a mechanical splicing device which is operated using several instruments, it is somewhat difficult to use the mechanical splicing method in an optical fiber laying site. In addition, the above mechanical splicing device used in the mechanical splicing method fails to tightly clamp the coating parts of the optical fibers during the fiber splicing operation. The mechanical splicing device thus occasionally causes the spliced optical fibers to be distorted after the lapse of a long time and to break. In order to prevent the mechanically spliced optical fibers from breaking due to distortion, it is preferable to secondarily clamp the optical fibers at the coating parts of the fibers while clamping the cladding parts of the fibers at the same time, preventing the torsional force from being directly applied to the cladding parts of the fibers. In a known mechanical splicing device with a double clamping function, the first and second clamping parts, that is, the cladding and coating parts of the optical fibers are clamped at the same time.

The above mechanical splicing device should use specific instruments for clamping the optical fibers in order to maintain the arrayed fibers during the fiber splicing operation. As the above device uses the specific instruments to clamp the optical fibers, the arrayed fibers may be thrust axially when the clamping force is axially applied to the fibers during the fiber splicing operation. The above mechanical splicing device thus often fails to precisely splice the optical fibers and causes a splicing loss. In an effort to rectify the above problem, the mechanical splicing device may be provided with an additional structure for preventing a pressing plate of the clamp unit from being thrust axially during the fiber splicing operation. However, the above structure for preventing the pressing plate from being axially thrust is small-sized such that it is very difficult to form the structure. In addition, the above thrust preventing structure has a structural fault requiring careful handling during the fiber splicing operation.

The double clamping function of the splicing device is for reducing the strain in the spliced junction of the optical fibers. In the fiber splicing device with the above double clamping function, the clamping motion (first clamping motion) for clamping the cladding parts (splicing parts) of the optical fibers and the other clamping motion (second clamping motion) for clamping the coating parts of the optical fibers are performed at the same time. When clamping the optical fibers while inserting one fiber into one insert hole of the above splicing device, both the coating and cladding parts (first and second clamping parts) of the inserted fiber are pressed down in the splicing section of the device at the same time. The splicing section of the splicing device is thus closed so that the other optical fiber cannot reach the splicing section when inserting the other fiber into the splicing device through the other insert hole of the device. It is thus difficult to align the cladding parts of the optical fibers in the splicing device during the fiber splicing operation. In order to rectify the above problem, the one and other optical fibers may be inserted into both insert holes of the splicing device while opening the cladding and coating clamps, which clamp the cladding and coating parts of the fibers respectively, prior to clamping the cladding and coating parts of the fibers at the same time. However, as one end portion of the above splicing device is not fixed during the splicing operation, it is difficult to perform a tuning step for splicing the fibers with low loss. The above tuning step is performed to achieve the optimal alignment of the optical fibers. Of course, the fiber splicing operation may be performed without any tuning steps. However, when the fiber splicing operation is performed without any tuning steps, the splicing operation may cause a problem in that the operation should be repeated in the event of bad results of a splicing loss measurement.

SUMMARY OF THE INVENTION

It is, therefore, an object of the present invention to provide a rail-type device for mechanically splicing optical fibers in which the above problems can be overcome and which not only has a cladding clamp with a seesaw structure thereby easily splicing the optical fibers without using any specific instruments, it also separately moves a pair of covers thereby easily performing the tuning operation during the fiber splicing operation. The above splicing device also includes an axial thrust preventing means, comprising coating clamp's protrusions and body's slots engaging with each other, whereby the coating clamps are exclusively vertically moved relative to the body and a splicing failure of the optical fibers due to an axial thrust of the fibers is prevented. The above splicing device is further provided with a double clamping function for separately clamping the coating and cladding parts of the optical fibers, whereby the spliced fibers are prevented from breaking due to tensile or torsional force.

In accordance with an embodiment, the present invention provides a rail-type device for mechanically splicing optical fibers of a single or multi-core structure, comprising: a body opened upward to form a splicing space therein, both bottom side edges of said body being provided with axially extending rail grooves; a base panel received in said splicing space of the body and having a V-shaped groove, said v-shaped groove being axially formed on the top surface of said base panel and adapted for laying the optical fibers therein; a cladding clamp and a coating clamp placed on said base panel to move up and down, thereby selectively clamping the cladding and coating parts of the optical fibers respectively; and a cover slidably engaging with said body and adapted for selectively pressing said cladding and coating clamps down to fix the optical fibers in said splicing device.

In accordance with another embodiment, the splicing device also includes an axial thrust preventing means, comprising protrusions formed on both side surfaces of each coating clamp and slots formed on both side walls of the body and engaging with the protrusions, thereby preventing the optical fibers from being axially thrust during the clamping operation.

BRIEF DESCRIPTION OF THE DRAWINGS

The above and other objects, features and advantages of the present invention will be more clearly understood from the following detailed description taken in conjunction with the accompanying drawings, in which:

FIG. 6 is a perspective view of the cover and body of the splicing device of the present invention, showing a rail means comprising rails and grooves of the above cover and body slidably engaging with each other;

FIG. 7 is a perspective view of the coating clamp and body of the splicing device provided with protrusion and slot as an axial thrust preventing means in accordance with another embodiment of the present invention.

DESCRIPTION OF THE PREFERRED EMBODIMENTS

Figure 1:
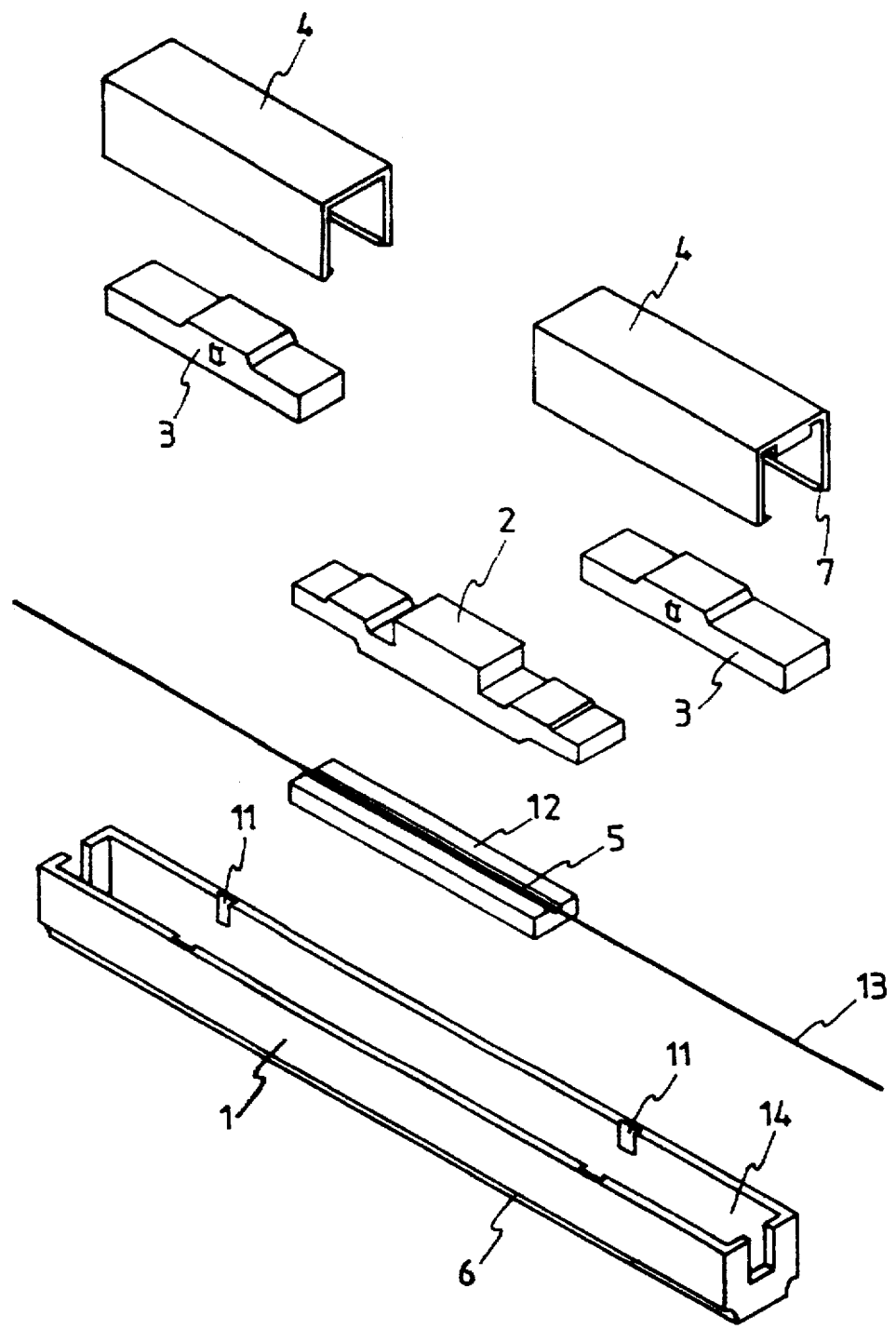
FIG. 1 is an exploded perspective view of a rail-type splicing device for optical fibers in accordance with an embodiment of the present invention.

FIG. 1 is an exploded perspective view showing the construction of a rail-type device for mechanically splicing optical fibers in accordance with an embodiment of the present invention. As shown in this drawing, the splicing device of this invention includes a longitudinal body 1 which receives a longitudinal base panel 12 therein. The body 1 is opened upward thereby having a U-shaped cross-section and forming a splicing space 14 therein. The above splicing space 14 has a predetermined depth and size suitable for receiving a pair of optical fibers 13 therein. Both bottom side edges of the body 1 are provided with axially extending rail grooves 6 which will engage with rails 7 of covers 4 as will be described later herein. A V-shaped groove 5 is axially formed on the top surface of the base panel 12 which is received in the body 1. The optical fibers 13 to be spliced together by the device are laid in the above groove 5 to be aligned with each other at their cladding parts.

The above splicing device also includes two types of clamps, that is, one cladding clamp 2 for clamping the cladding parts (splicing parts) of the optical fibers 13 and a pair of coating clamps 3 for clamping the coating parts of the fibers 13. The above cladding and coating clamps 2 and 3 are placed on the base panel 12 in the body 1 to move up and down, thereby clamping the cladding and coating parts of the fibers 13 respectively. The opened space 14 of the body 1 is covered with the pair of covers 4 which slidably engage with the body 1. Each cover 4 has the pair of rails 7 which are formed on both side walls of each cover 4 and slidably engage with the rail grooves 6 of the body 1, thereby forming a rail means. With the slidable engagement of the grooves and rails 6 and 7, the covers 4 horizontally move relative to the body 1. That is, each cover 4 slidably moves between the center and an associated end of the body 1. In the above splicing device, each coating clamp 3 has a top embossment 15, while the cladding clamp 2 has a pair of top side embossments 20 for generating a size interference. The above covers 4 press the cladding and coating clamps 2 and 3 down due to the size interference between the covers 4 and the embossments 15 and 20 of the clamps 3 and 2, thereby tightly clamping or fixing the optical fibers 13 arrayed in the V-shaped groove 5 of the panel 12.

Figure 2A:
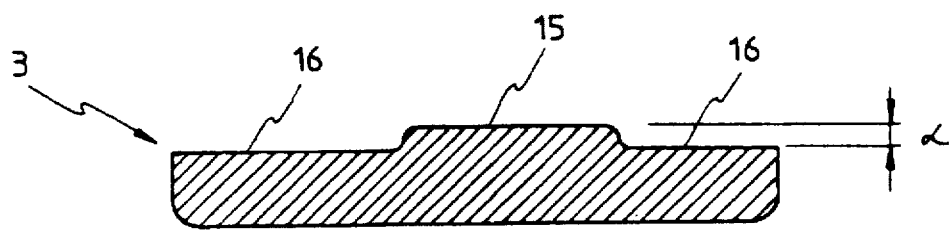
FIGS. 2A to 2C are sectional views of the coating clamp, cover and cladding clamp of the splicing device of FIG. 1 respectively, showing uniquely stepped configurations of them for generating a size interference between them.
Figure 2B:
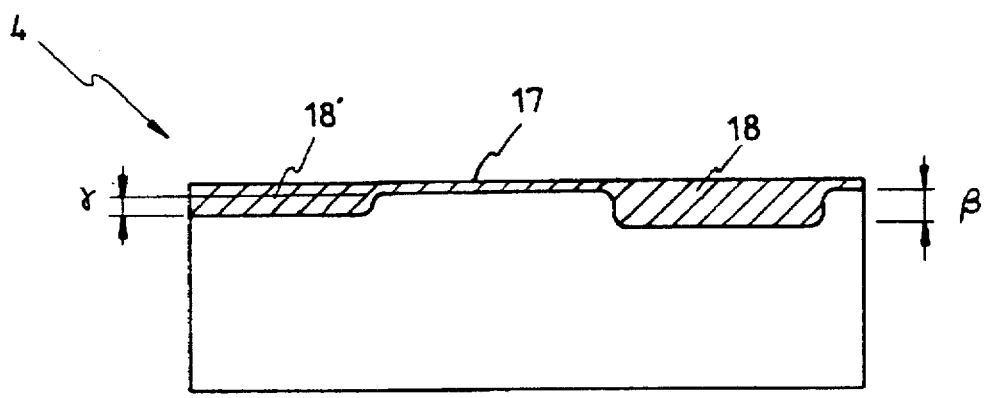
Figure 2C:
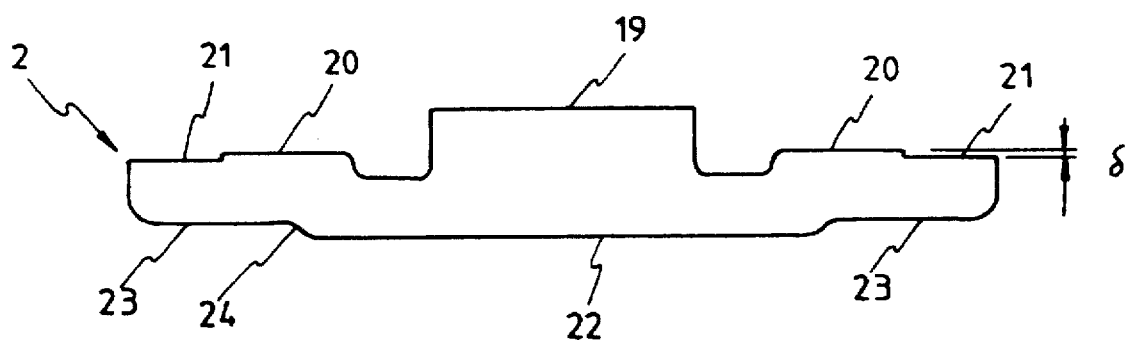

FIGS. 2A to 2C are sectional views of the coating clamp 3, cover 4 and cladding clamp 2 of the splicing device of FIG. 1 respectively. Particularly, FIGS. 2A to 2C show stepped configurations of the cover 4 and clamps 2 and 3 for generating the size interference.

As shown in FIG. 2A, each coating clamp 3 used for clamping the coating part of an associated optical fiber is stepped on its top surface 16 to form the embossment 15 on the top center of the surface 16. The height of the above embossment 15 is represented as $\alpha$ (height difference between the portions 15 and 16) in FIG. 2A. As shown in FIG. 2B, the top plate of each cover 4 which is placed over an associated coating clamp 3 is stepped on its internal surface to form a pair of thick side portions 18 and 18' with a thin center portion 17. The two thick side portions 18 and 18' have different thicknesses. That is, the first thick portion 18 which has a height difference $\beta$ between the portions 17 and 18 is thicker than the second thick portion 18' which has a height difference $\tau$ between the portions 17 and 18'. Due to the stepped top plate of each cover 4, a size interference is selectively generated between each cover 4 and an associated coating clamp 3 thereby selectively pressing the coating clamp 3 down and causing the clamp 3 to generate a downward clamping force for clamping the coating part of the fiber 13. FIG. 2C shows the configuration of the cladding clamp 2 used for commonly clamping the cladding parts (splicing part) of the optical fibers 13. As shown in FIG. 2C, the cladding clamp 2 is symmetrically stepped on its top surface to form a top center embossment 19 and the pair of top side embossments 20. The center embossment 19 is further embossed than the side embossments 20. A groove is formed between the center embossment 19 and each side embossment 20. The top surface of the clamp 2 is also stepped on both its edges to form a pair of depressed edges 21 which extend from the side embossments 20 outward, respectively. The height of each side embossment 20 is represented as $\delta$ (height difference between the portions 20 and 21) in FIG. 2C. On the other hand, the bottom surface 23 of the above cladding clamp 2 is stepped to form a bottom center embossment 22.

Figure 3:
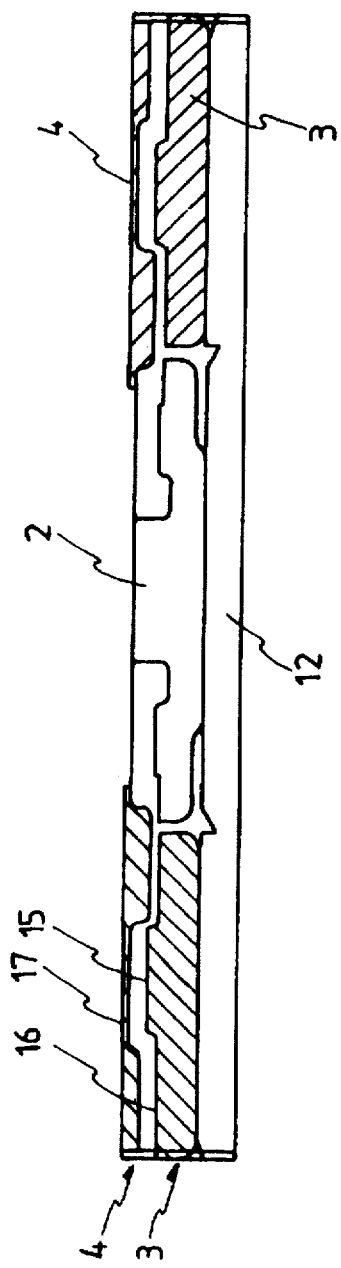
FIG. 3 is a sectional view of the splicing device of the present invention with the covers placed in their opened positions.
Figure 4:
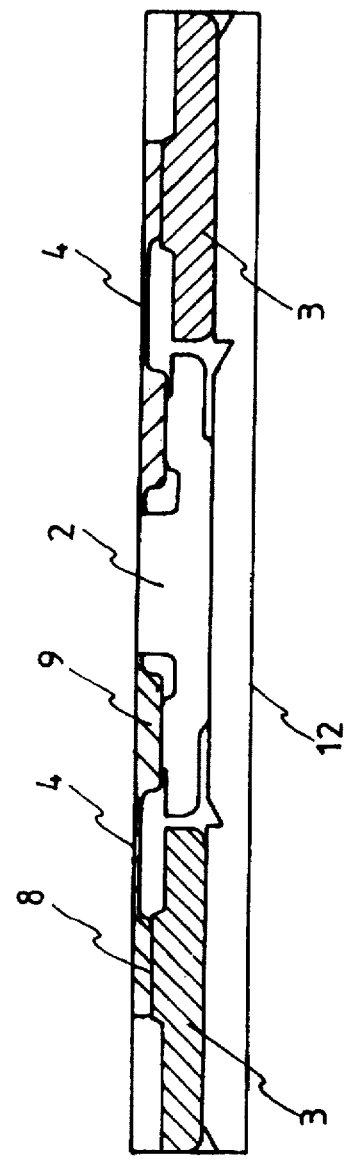
FIG. 4 is a sectional view of the splicing device of the present invention with the covers placed in their closed positions.

FIGS. 3 and 4 are sectional views of the splicing device of this invention to represent the size interference selectively generated between the covers 4 and clamps 2 and 3 in accordance with positions of the covers 4. FIG. 3 shows the covers 4 placed in their opened positions, while FIG. 4 shows the covers 4 placed in their closed positions. When the covers 4 are in their opened positions as shown in FIG. 3, the top embossments 15 of the coating clamps 3 meet with the thin center portions 17 of the covers 4 respectively. In this state, the size interference is not generated between the coating clamps 3 and covers 4 so that the clamps 3 do not generate any clamping force.

However, when the covers 4 are in their closed positions as shown in FIG. 4, the size interference is generated between the clamps 3 and covers 4, thereby generating the clamping force of the clamps 3 for maintaining the arrayed optical fibers 13 in the V-shaped groove 5 of the base panel 12. In order to reach the closed positions of FIG. 4, the covers 4 move inward relative to the body 1 by the sliding motion of the rails 7 of the covers 4 along the rail grooves 6 of the body 1. In this state, the size interferences are generated between the covers 4 and clamps 2 and 3 as the embossments of the covers 4 and clamps 2 and 3 meet together. That is, the interference between the coating clamps 3 and covers 4 is generated at portions 8 due to the height differences $\alpha$ and $\tau$. Meanwhile, the interference between the cladding clamp 2 and covers 4 is generated at portions 9 due to the height differences $\beta$ 15 and $\delta$. Due to the above size interferences generated at portions 8 and 9, the coating clamps 3 and cladding clamp 2 are pressed down by the covers 4 in proportion to the interference amounts, thereby clamping the coating and cladding parts of the optical fibers 13 and fixing the arrayed fibers 13 in the splicing device.

Figure 5A:
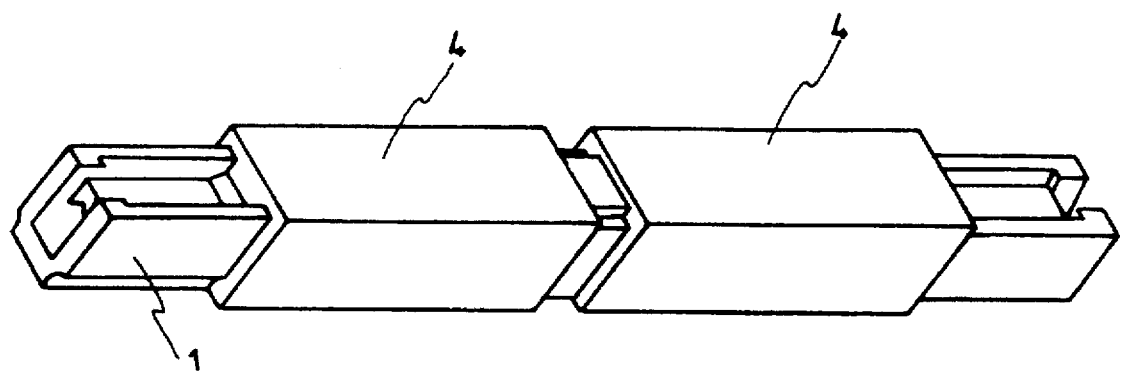
FIGS. 5A and 5B are perspective views of the splicing device of the present invention with the closed and opened covers, respectively.
Figure 5B:
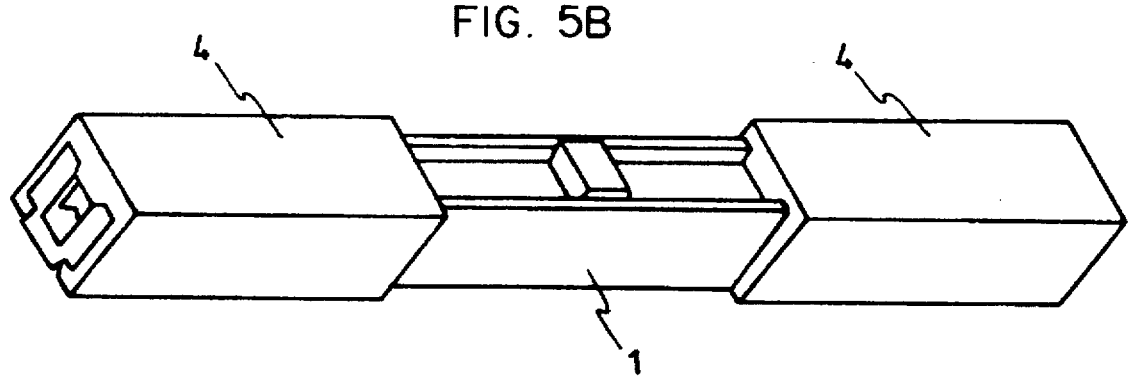

FIGS. 5A and 5B are perspective views of the splicing device of this invention with the closed and opened covers 4 respectively. These drawings particularly show the sliding motion of the covers 4 relative to the body 1 for generating the clamping force due to the size interferences between the covers 4 and clamps 2 and 3. The sliding motion of the covers 4 relative to the body 1 is achieved by the sail means. The above rail means is the base for generating the clamping force of the splicing device and guides the sliding motion of the covers 4 relative to the body 1.

FIG. 6 shows in detail the rail means of the optical fiber splicing device of this invention. As shown in this drawing, the rail means comprises the rails 7 and grooves 6 which slidably engage with each other. In the embodiment of this invention, the rails 7 are formed in each cover 4, while the grooves 6 are formed in the body 1. Of course, it should be understood that the grooves 6 and rails 7 may be formed in the covers 4 and body 1, respectively.

In accordance with another embodiment of this invention, the optical fiber splicing device may be provided with means for preventing the covers 4 from axially thrusting the optical fibers 13 during the sliding motion of the covers 4 relative to the body 1. As shown in FIG. 7, the axial thrust preventing means comprises protrusions 10 and slots 11. The protrusions 10 are formed on both side surfaces of each coating clamp 3, while the slots 11 for receiving the protrusions 10 are formed on the internal surfaces of both side walls of the body 1. In the above embodiment, the axial thrust preventing means achieves a structural balance as both the protrusions 10 and slots 11 are formed on both sides of each clamp 3 and body 1. With the above axial thrust preventing means, the splicing device prevents fiber splicing loss, partial stress application and optical fiber's breakage caused by the axial thrust generated during the clamping operation.

In the present invention, each protrusion 10 of the coating clamps 3 has a balled portion. In the same manner, each slot 11 of the body 1 has a balled socket for receiving the balled portion of the protrusion 10 thereby forming a ball-and-socket joint. With the ball-and-socket joint, each coating clamp 3 has a seesaw structure having the balled protrusions 10 as the seesawing shaft. Due to the seesaw structure, each coating clamp 3 performs a seesawing motion thereby being easily lifted to allow the optical fiber 13 to be easily inserted into the splicing device when the optical fiber 13 is initially inserted into the device.

The operational effect of the above optical fiber splicing device will be described in detail hereinbelow.

When one optical fiber or a first fiber 13 is inserted into the splicing device through one insert hole while placing one cover 4 in its closed position, the first fiber 13 can be easily inserted into the device due to the seesawing motion of one coating clamp 3. In this case, the splicing or cladding part of the first fiber 13 will naturally and smoothly reach the bottom center of the cladding clamp 2 by simply inserting the first fiber 13 into the device until the cladding part of the fiber 13 reaches the bottom of the cladding clamp 2. After the cladding part of the first fiber 13 reaches the bottom center of the cladding clamp 2, the other cover 4 which has been opened is moved to its closed position to fix the first fiber 13 in the device. Thereafter, the one cover 4 is moved from the closed position to the opened position prior to inserting the other optical fiber or a second fiber 13 into the device through the other insert hole. The second fiber 13 is thus smoothly inserted into the device due to the seesawing motion of the other coating clamp 3 until the cladding part of the second fiber 13 comes into contact with that of the first fiber 13. Thereafter, the one cover 4 is closed to finish the optical fiber splicing operation. In the present invention, the cladding clamp 2 is preferably formed of a transparent material into a convex lens configuration thereby easily checking the contact alignment of the cladding parts of the first and second fibers 13 from the outside of the device.

When the cladding parts of the optical fibers 13 have a bad contact alignment, one of the covers 4 is opened prior to tuning the optical fibers. After tuning, the opened cover 4 is closed to fix the fiber 13 in the splicing device. In addition, it is preferable to use refractive index regulating liquid in the cladding junction between the optical fibers 13. In this case, the device reduces the insertion and reflection loss and thereby reduces the fiber splicing loss.

Hereinbelow, the seesaw structure of the cladding clamp 2 will be described in detail.

Figure 8:
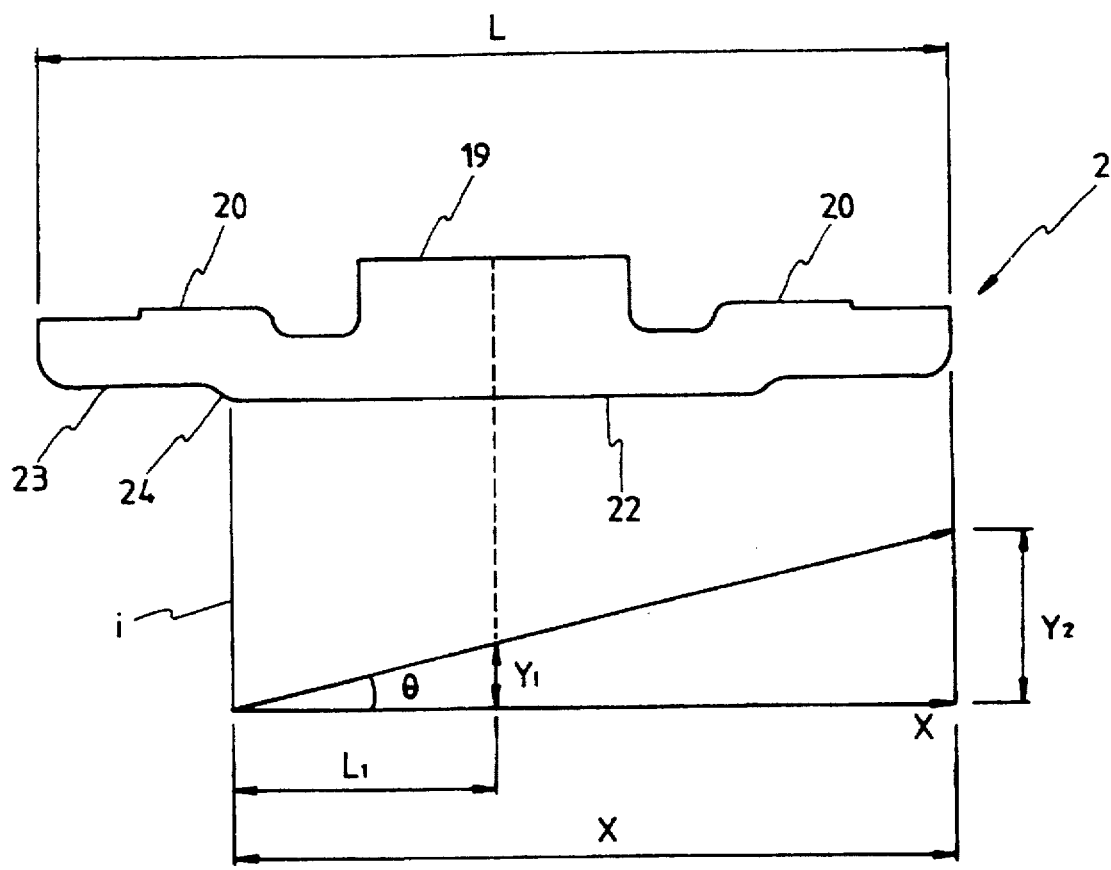
FIG. 8 is a view representing the seesaw structure and seesawing motion of the cladding clamp of the splicing device according to the present invention.

FIG. 8 is a view representing the seesaw structure of the cladding clamp 2 of the splicing device of the present invention. As shown in FIG. 8, the bottom surface 23 of the above cladding clamp 2 is stepped at portions 24 to form the bottom center embossment 22. The cladding clamp 2 selectively comes into contact with the covers 4 at the side embossments 20 thereby being pressed down to generate the clamping force. The center of each side embossment 20 is positioned outside a seesawing axis "i" vertically extending from each step 24. When one of the covers 4 is in its closed position, the closed cover 4 thus presses a corresponding half portion of the clamp 2 down while lifting the other half portion of the clamp 2. In this case, the lifting height $Y_1$ of the clamp 2 is preset as the result of subtracting the thickness of a part of the fiber 13 received in the V-shaped groove 5 of the panel 12 from the diameter of the fiber 13. The above lifting height $Y_1$ can be designed using variables X and $L_1$. In this case, the variable X is the distance between a step 24 and an opposite end of the clamp 2, while the variable $L_1$ is the distance between the step 24 and the center of the clamp 2.

In addition, the space height $Y_2$ between each depressed edge 21 of the cladding clamp 2 and the first thick portion 18 of an associated cover 4 will be represented by the following equation $$Y_2 = X \cdot Y_1 / L_1$$

wherein

X is the distance between the seesawing axis "i" and one end of the cladding clamp;

$L_1$ is the distance between the seesawing axis "i" and the center of the cladding clamp; and i is the seesawing axis vertically extending from each step of the cladding clamp 2.

The seesaw structure of the cladding clamp 2 of the splicing device of this invention is designed by the above equation. When one cover 4 is closed to press one half portion of the cladding clamp 2, the other half portion of the clamp 2 is lifted due to the above seesaw structure, thereby allowing the cladding part of an optical fiber 13 to smoothly reach the bottom center of the clamp 2. In addition, as the cladding clamp 2 is formed of a transparent material into a convex lens configuration as described above, the contact alignment of the cladding parts of the optical fibers 13 can be checked from the outside of the device. Therefore, it is possible to determine whether the contact alignment of the fibers 13 needs to perform the tuning step. The operational effect of the splicing operation is thus further improved.

As described above, the present invention provides a structurally improved mechanical splicing device for optical fibers. As the device of this invention is provided with a cladding clamp having a seesaw structure, the device easily splices the optical fibers having single or multi-core structure without using any specific instruments. The splicing device separately clamps the coating and cladding parts of the optical fibers through double clamping motions during the fiber splicing operation. The device thus reduces strain of the optical fibers and prevents breaking of the spliced fibers due to distortion. The above splicing device also vertically applies the clamping force to the optical fibers during the clamp operation, thereby preventing alignment failure of the optical fibers without using any instruments. Another advantage of the fiber splicing device resides in that the device reduces the number of elements and simplifies the structure while compositely performing various functions and easily splicing the optical fibers.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rail-type device for mechanically splicing optical fibers of a single or multi-core structure, comprising:

a body opened upward to form a splicing space therein, both bottom side edges of said body being provided with axially extending rail grooves;

a base panel received in said splicing space of the body and having a V-shaped groove, said base panel having a top surface, said V-shaped groove being axially formed on the top surface of said base panel and adapted for laying the optical fibers therein;

a cladding clamp and a coating clamp placed on said base panel to move up and down, thereby selectively clamping the cladding and coating parts of the optical fibers respectively; and a cover slidably engaging with said rail grooves of said body and adapted for selectively pressing said cladding and coating clamps down to fix the optical fibers in said base panel.

2. The rail-type splicing device according to claim 1 wherein a top plate of said cover is stepped on its internal surface to form a pair of thick portions with a thin center portion formed between said thick portions.

3. The rail-type splicing deride according to claim 2, wherein said thick portions of the cover have different thicknesses.

4. The rail-type splicing device according to claim 1, wherein said cladding clamp includes:

a top center embossment, a pair of top side embossments and a pair of depressed edges formed by stepping a top surface of said cladding clamp, said top center embossment being further embossed than said top side embossments and said depressed edges extending outward from said top side embossments respectively; and a bottom center embossment formed by stepping a bottom surface of said cladding clamp at a pair of steps.

5. The rail-type splicing device according to claim 4, wherein said cladding clamp has a symmetrical configuration.

6. The rail-type splicing device according to claim 1, wherein said body is a longitudinal body having a U-shaped cross-section.

7. The rail-type splicing device according to claim 1, wherein said coating clamp is stepped on its top surface to form a center embossment.

8. The rail-type splicing device according to claim 1, wherein the center of each top side embossment of said cladding clamp is positioned outside an associated step of sub pair of steps of the bottom surface of said cladding clamp, thereby causing said cladding clamp to perform a seesawing motion for lifting one half portion of the cladding clamp when said cover presses said top side embossment down.

9. The rail-type splicing device according to claim 1, wherein said cladding clamp is formed of a transparent material into a convex lens configuration.

10. A rail-type device for mechanically splicing optical fibers of a single or multi-core structure, comprising:

a body with bottom side edges and a side wall, said body opened upward to form an internal surface with a slicing space therein, both bottom side edges of said body having axially extending rail grooves, while a side wall of said body has a slot on its internal surface;

a base panel received in said splicing space of the body and having a V-shaped groove, said base panel having a top surface, said V-shaped groove being axially formed on the top surface of said base panel and adapted for arraying the optical fibers therein;

a coating clamp placed on said base panel to move up and down thereby selectively clamping coating parts of the optical fibers, said coating clamp having a protrusion on a side surface thereof, said protrusion being brought into engagement with said slot of the body thereby preventing said optical fibers from being axially thrust;

a cladding clamp placed on said base panel to move up and down thereby selectively clamping cladding parts of the optical fibers; and a cover slidably engaging with said rail grooves of said body and adapted for selectively pressing said cladding and coating clamps down to fix the optical fibers in said base panel.

11. The rail-type splicing device according to claim 10, wherein a top plate of said cover is stepped on its internal surface to form a pair of thick portions with a thin center portion formed between said thick portions.

12. The rail-type splicing device according to claim 11, wherein said thick portions of the cover have different thicknesses.

13. The rail-type splicing device according to claim 10, wherein said cladding clamp includes:

a top center embossment, a pair of top side embossments and a pair of depressed edges formed by stepping a top surface of said cladding clamp, said top center embossment being further embossed than said top side embossments and said depressed edges extending outward from said top side embossments respectively; and a bottom center embossment formed by stepping a bottom surface of said cladding clamp at a pair of steps.

14. The rail-type splicing device according to claim 13, wherein said cladding clamp has a symmetrical configuration.

15. The rail-type splicing device according to claim 10, wherein said body is a longitudinal body having a U-shaped cross section.

16. The rail-type splicing device according to claim 10, wherein said coating clamp is stepped on its top surface to form a center embossment.

17. The rail-type splicing device according to claim 10 wherein the center of each top side embossment of said cladding clamp is positioned outside an associated step of the bottom surface of said cladding clamp, thereby causing said cladding clamp to perform a seesawing motion for lifting one half portion of the cladding clamp when said cover presses said top side embossment down.

18. The rail-type splicing device according to claim 10, wherein said cladding clamp is made of a transparent material into a convex lens configuration.

19. The sail-type splicing device according to claim 10, wherein said protrusion of the coating clamp has a balled portion, while said slot of the body has a balled socket for receiving said balled portion of the protrusion thereby forming a ball-and-socket joint.

* * * * *